United States Patent
Moras et al.

(10) Patent No.: US 11,021,124 B2
(45) Date of Patent: Jun. 1, 2021

(54) STEERING WHEEL OF A VEHICLE

(71) Applicant: Autoliv Development AB, Vårgårda (SE)

(72) Inventors: Alexis Moras, Poitiers (FR); Nicolas Proust, Neuville de Poitou (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 812 days.

(21) Appl. No.: 15/677,425

(22) Filed: Aug. 15, 2017

(65) Prior Publication Data
US 2018/0056914 A1 Mar. 1, 2018

(30) Foreign Application Priority Data

Aug. 16, 2016 (FR) ...................................... 1657762

(51) Int. Cl.
*B60R 21/203* (2006.01)
*F16B 5/00* (2006.01)
*B60R 11/00* (2006.01)

(52) U.S. Cl.
CPC ........ *B60R 21/203* (2013.01); *B60R 21/2035* (2013.01); *F16B 5/00* (2013.01); *B60R 2011/001* (2013.01)

(58) Field of Classification Search
CPC ... B60Q 5/003; B60R 21/203; B60R 21/2035; B60R 21/2037; B60R 21/05; Y10T 403/1616; Y10T 403/1624; F16B 5/0628; F16B 5/065; F16B 5/0657
See application file for complete search history.

(56) References Cited

U.S. PATENT DOCUMENTS

| 4,249,579 A | * | 2/1981 | Baumann | ............. | D03C 9/0633 |
| | | | | | 139/92 |
| 4,657,052 A | * | 4/1987 | Baumann | ............. | D03C 9/0633 |
| | | | | | 139/92 |
| 8,608,194 B2 | | 12/2013 | Marotzke | | |
| 2011/0233905 A1 | | 9/2011 | Marotzke | | |

FOREIGN PATENT DOCUMENTS

| DE | 102010015340 A1 | | 10/2011 | | |
| DE | 102013213822 A1 | | 1/2015 | | |
| EP | 0 710 590 | * | 12/1998 | ............. | B60R 21/20 |
| EP | 1 088 712 | * | 4/2001 | ............. | B60R 21/20 |
| EP | 0 827 878 | * | 10/2001 | ............. | B60R 21/20 |

OTHER PUBLICATIONS

French Search Report and Written Opinion for priority application FR 1657762, INPI, dated May 4, 2017.

* cited by examiner

*Primary Examiner* — Michael P Ferguson
(74) *Attorney, Agent, or Firm* — Stephen T. Olson; Harness, Dickey & Pierce, P.L.C.

(57) ABSTRACT

A vehicle steering wheel includes a base part such as a frame, at least one added part such as a safety module, at least one centring part, and a regulating device for regulating a position of the added part on the base part. The regulating device includes at least one stud, and at least one impression. The at least one impression is arranged to receive the at least one stud in accordance with a first mounting position or at least one second mounting position, in such a manner as to impose a first position of the added part relative to the base part or to impose a second position of the added part relative to the base part.

16 Claims, 3 Drawing Sheets

A-A

B-B

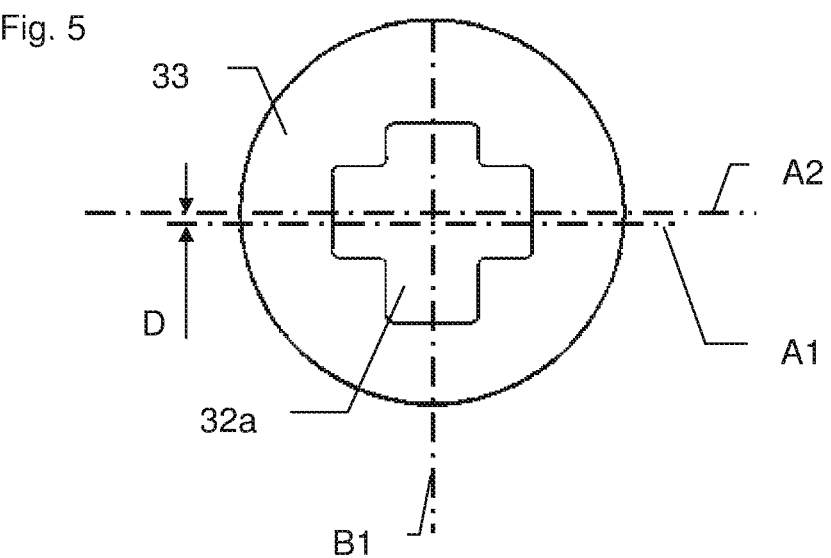

STEERING WHEEL OF A VEHICLE

CROSS-REFERENCE TO RELATED APPLICATIONS

This Application claims priority to Application FR 1657762, filed on Aug. 16, 2016 in France.

FIELD

The present disclosure relates in a general manner to a vehicle steering wheel mounted on an automobile, and in particular a vehicle steering wheel which comprises an added part visible by a user, and which should be positioned in a harmonious manner relative to the other elements of the steering wheel. In particular, the added part can be a safety module (also called an airbag module) placed on a base part of the steering wheel (the frame, for example) and should be centered relative to the other parts from the viewpoint of the steering wheel, and it can be useful to provide means for regulating the position of the added part.

BACKGROUND

In fact, due to the tolerances of manufacture, it can be necessary to regulate the position of the added part during the mounting of the steering wheel. It is known in the prior art to use eccentric regulating means like those described in the document U.S. Pat. No. 8,608,194B2. On the other hand, this system has in particular the disadvantage of being complicated to implement because it is necessary to pivot the eccentric by a particular value. Moreover, it is necessary to provide a system of slides if the regulating is to be made only in a single axial direction, which complicates even more the complete device. Finally, a deregulating is possible if the eccentric pivots in an irregular manner or during an inappropriate command of an operator.

SUMMARY

A goal of the present disclosure is to respond to the disadvantages of the above-mentioned document of the prior art and in particular, first of all, to propose a vehicle steering wheel provided with an added part and with means for regulating the position of the added piece, which regulating means is simple to use and simple to construct.

To this end a first aspect of the disclosure concerns regulating means designed to regulate a position between a base part of a vehicle steering wheel such as a frame, and an added part of the vehicle steering wheel comprising, for example, a safety module, and placed on the base part by at least a part of the centring integral with the one base part or of the added part, which regulating means are designed to engage with the other base part or with the added part and comprise a reference surface for engaging with the at least one centring part, characterized by that: the regulating means comprises at least one regulating module with at least one receiving element extended along a direction of projection, at least one regulating element with a counter-form arranged to receive the at least one receiving element in order to prevent a rotation around the direction of projection between the at least one receiving element and the at least one regulating element, and that the at least one regulating element is designed to be assembled with at least one receiving element according to a first mounting position or at least one second mounting position, and in that the at least one receiving element or the at least one regulating element is integral with the reference surface and offset relative to the reference surface in order to offset the other at least one receiving element or the at least one regulating element relative to the centring part when the reference surface is engaged with the centring part in such a manner as to impose a first position of the added part relative to the base part in the first mounting position or to impose a second position of the added part relative to the base part in the second mounting position.

The regulating means according to the above implementation for a steering wheel comprises a regulating module with an offset of an axis of the regulating element or of the receiving element relative to an axis of a centring surface or of a reference surface. The offset obtained is therefore predetermined. Therefore, when mounting the regulating element in or on the receiving element according to the first or the second mounting position, the added part is offset relative to the base part by a first or a second value, which allows its position to be regulated in a particularly simple and rapid manner during manufacturing operations.

Moreover, the receiving element receives the regulating element in order to block it in rotation, that is to say, to prevent any relative rotation between these two elements in the first or the second mounting position. As a consequence, when the regulating module is mounted, the regulating position is definitive and cannot be changed until the regulating module is dismounted (by decoupling the regulating element and the receiving element). It is then easy to regulate the position of the added part since the regulating module only offers a limited and finite number of mounting positions. Of course, the term "prevent" denotes a rotation by a definitive indexing of the pieces between themselves within the limits of their mechanical resistance. On the contrary, the blockage of rotation is definitive and is not temporary or reversible like a braking obtained by a pawl system. Therefore, there is no need for a complementary device such as a screw for fixing the regulating means in the selected position.

The first position and the second position are advantageously predetermined positions. That is to say that they are defined during the designing of the parts and not by adjustment movements during the assembly phases.

The receiving element advantageously receives the regulating element in order to block any translation of it in a plane perpendicular to the direction of projection.

The offset is predefined in the first or in the second mounting position. It is possible to envision, for example, providing the value of the offset in a statistical manner in order to take care of the greatest number of cases of figures. It should be noted that the operator cannot modify the position of the added piece once the regulating module is mounted, and that the regulating cannot be modified by itself because the receiving element receiving the regulating element does not allow any relative rotation between these two elements.

The term "receiving element" denotes a surface forming a male or female portion of a part and "control element" denotes the counter-form regulating, that is, a surface forming a female or male portion of a regulating part. It is possible to envisage cylindrical surfaces (but not with a circular section because there must be a stop in rotation) or slightly conical surfaces (therefore, with a slight clearance in order to be manufactured by moulding).

The regulating means is arranged to engage with the other one of the base part or of the added part, and comprises a reference surface designed to engage with the at least one centring part. In other words, the regulating means is engaged or solidary or placed on the other base part or the added part (the part without a centring part), and can engage (in a reversible manner or according to several mounting positions) with the centring part.

The regulating means is advantageously designed to regulate the position of the added part in a base plane and in which the direction of projection is perpendicular to the base plane.

The at least one second mounting position is advantageously oriented at 180° from the first mounting position relative to the direction of projection. It is sufficient to pivot the impression or the stud through half a turn in order to bring about the regulating of the position of the added part.

The at least one regulating element is advantageously designed to be assembled with the at least one receiving element according to at least one third mounting position, and the at least one receiving element or the at least one regulating element is designed to position the other at least one receiving element or the at least one regulating element relative to the centring part in such a manner as to impose a third position of the added part relative to the base part in the third mounting position.

A reference point of the added part in the third mounting position is advantageously situated in the middle of a segment having as ends the reference point of the added part in the first mounting position and the reference point of the added part in the second mounting position. It is possible to envision that in the third position no offset is imposed so that the third position returns to a nominal mounting position. It is then possible to obtain a nominal positioning in a simple manner or an extreme positioning in one direction or an extreme positioning in the opposite direction.

The regulating means is advantageously designed to regulate the position of the added part in only one direction.

The first mounting position is advantageously different from the second mounting position.

The regulating means advantageously comprises elastic support means of the at least one regulating element on the at least one receiving element at least in the direction of projection. The regulating module can be transported when it is mounted on the base part or the added part in an easy manner by an operator without risking losing the components.

The at least one regulating element advantageously has a tight adjustment with the at least one receiving element. Such a tight adjustment brings about the possibility of transporting the parts without risking dismounting or loss.

The at least one receiving element has a transversal section which brings about a stop of the rotation relative to the direction of projection. Such a section can be rectangular or oblong in order to bring about the stop of the rotation with the regulating element.

A second aspect of the disclosure relates to a vehicle steering wheel comprising: a base part such as a frame, at least one added part comprising, for example, a safety module and placed on the base part, and regulating means.

At least one of the at least one receiving element or of the at least one regulating element is movable relative to the vehicle steering wheel. This allows an easy regulating.

The at least one centring part has a median axis and/or a median coupling plane with the regulating means and this one of the at least one receiving element or of the at least one regulating element is offset relative to the median axis and/or to the median coupling plane.

In other words, the at least one centring part has a first median axis and/or a first median coupling plane with the regulating means, and the at least one receiving element or the at least one regulating element has a second median axis and/or a second median coupling plane with the at least one centring part, which second medium axis and/or second median coupling plane is/are offset relative to this first median axis and/or first median coupling plane.

The at least one receiving element is advantageously integral with the base part and the at least one regulating element is arranged on a movable casing in order to engage with the added part.

The regulating means advantageously comprises two regulating modules. It is also possible to provide a supplementary sliding connection (a stud between two wings, for example) in order to position the added part in an isostatic manner on the base part.

The added part is advantageously a fixed plate with a warning signal mounted in a fixed manner relative to the base part by the at least one regulating module, and comprising a safety module that can move relative to the added part. The regulating modules can be designed independently of the movement necessary for the warning signal since they only position the fixed plate.

This one receiving element of this one regulating element advantageously has a prismatic shape and/or a transversal section which brings about a stopping of rotation. Such a section can be rectangular or oblong.

A third aspect of the disclosure concerns an automobile comprising a vehicle steering wheel according to the second aspect of the disclosure.

The regulating means advantageously comprises a visual mark arranged to indicate a direction of regulating the position of the added part and visible for an operator once the regulating module is mounted. It is possible to envision inscribing an arrow which indicates the direction of the offset brought about by the selected position.

A fourth aspect of the disclosure relates to a regulating kit for the regulating means according to the first aspect of the disclosure, comprising a plurality of the at least one receiving element or of the at least regulating element designed to offset the other one of the at least one receiving element or of the at least one regulating element relative to the centring part, each one designed to offset by a specific value the other at least one receiving element or at least one regulating element relative to the centring part.

In other words, the disclosure relates to a vehicle steering wheel comprising a base part such as a frame, at least one added part comprising, for example, a safety module and placed on the base part, at least one centring part integral with the one base part or with the added part, regulating means engaged with the at least one centring part and with the other base part or of the added part in order to allow a regulating of a position of the added part on the base part, characterized by that the regulating means comprises at least one regulating module with at least one stud extending along a direction of projection, at least one impression forming a counter-form designed to receive the at least one stud and to prevent in this manner a rotation about the direction of projection between the at least one stud in the at least one impression, in that the at least one impression is designed to receive the at least one stud according to a first mounting position or at least one second mounting position, and in that the at least one stud or the at least one impression is designed to offset the other at least one stud or the other at least one impression relative to the centring in such a manner as to impose a first position of the added part relative to the base part in the first mounting position or to impose a second position of the added part relative to the base part in the second mounting position.

The steering wheel according to the above implementation comprises a regulating module with an offset of an axis of the impression or of the stud relative to an axis of a centring or reference surface. Therefore, by mounting the stud in the impression according to the first or the second mounting position the added part is offset relative to the base part by a first or a second value, which allows its position to be regulated in a particularly simple and rapid manner during operations of manufacture.

Moreover, the impression receives a stud for blocking its rotation, that is, to prevent any relative rotation between these two elements in the first or the second mounting position. As a consequence, when the regulating module is mounted, the regulating position is definitive and cannot be changed unless by dismounting the regulating module (by decoupling the impression and the stud). It is then easy to regulate the position of the added part since the regulating module only offers a limited and finite number of mounting positions. Of course, the term "prevent" a rotation denotes a definitive indexing of the parts among themselves within the limit of their mechanical resistance. On the other hand, the blocking of rotation is definitive and is not temporary or reversible like a braking obtained by a pawl system. Therefore, there is no need for a complementary device such as a screw to fix the regulating means in the selected position.

It should be noted that the expression "the impression receives a stud" is equivalent to "the stud receives the impression" because the two components are assembled with one another.

The offset is predefined by construction in the first or in the second mounting position and is not adjustable. It is possible to envisage, for example, providing in a static manner the value of the offset in order to remedy the greatest number of cases of figures. It should be noted that the operator cannot modify the position of the added part once the regulating module has been mounted, and that the regulating cannot be modulated by itself because the impression receiving the stud does not offer any relative rotation between these two elements.

At least one of the at least one stud or of the at least one impression is advantageously movable relative to the vehicle steering wheel. This allows an easy regulating.

At least one of the at least one stud or of the at least one impression is advantageously movable relative to the vehicle steering wheel during a mounting phase of the vehicle steering wheel. The dismounting is only possible when the steering wheel is in the course of being mounted. Once the steering wheel is assembled, the regulating module is hidden by other parts so well that it can no longer be dismounted: the impression cannot be disengaged from the stud.

The at least one centring part advantageously has a first median axis and/or a first median coupling plane with the regulating means, and the at least one stud or the at least one impression has a second median axis and a second median coupling plane with the at least one centring part, which second median axis and/or second median coupling plane is/are offset relative to the first median axis and/or to the first median coupling plane.

In other words, the at least one centring part has a first median axis and/or a first median coupling plane with the regulating means, and the at least one stud or the at least one impression is offset relative to this first median axis and/or first median coupling plane.

The regulating means is advantageously designed to regulate the position of the added part in a base plane and the direction of projection is perpendicular to the base plane. As a consequence, the displacement of the added part between the first and the second position is contained in the base plane.

The at least one second mounting position is advantageously oriented 180° from the first mounting position relative to the direction of projection. It is sufficient to pivot the impression or the stud by one-half a turn to bring about the regulating of the position of the added piece.

The at least one impression is advantageously designed to receive the at least one stud according to at least one third mounting position, and the at least one stud or the at least one impression is designed to position the other at least one stud or the other at least one imprint relative to the centring part in such a manner as to impose a third position of the added part relative to the base part in the third mounting position.

A reference point of the added part in the third mounting position is advantageously situated in the middle of a segment having as ends the reference point of the added part in the first mounting position and the reference point of the added part in the second mounting position. It is possible to envision that in the third position no offset is imposed so that the third position returns to a nominal mounting position. It is then possible to obtain a nominal positioning in a simple manner or an extreme positioning in one direction or an extreme positioning in the opposite direction.

The regulating means are advantageously designed to regulate the position of the added part in only one direction.

The first mounting position is advantageously different from the second mounting position.

The regulating means advantageously comprises elastic support means of the at least one impression on the at least one stud at least in the direction of projection. The regulating module can be transported when it is mounted on the base part or the added piece which can easily be done by an operator without risking losing the components.

The at least one stud is advantageously integral with the base piece and the at least one impression is arranged on a movable casing designed to engage with the added part.

The at least one impression advantageously has a tight adjustment with the at least one stud. Such a tight adjustment allows the impression to be integrated on the stud.

The at least one impression has a part designed to create the tight adjustment with the at least one stud. It is possible to envision feet facing one another in order to pinch a part of the at least one stud. It is possible to preferably position these feet on surfaces of the impression which are not engaged with the at least one centring part in such a manner that the tightening does not influence the desired regulating.

The movable casing is advantageously designed to be clipped on the base part.

The regulating means advantageously comprises two regulating modules. It is also possible to provide a supplementary sliding connection (a stud between two wings, for example) in order to position the added part in an isostatic manner on the base part.

The added part is advantageously a plate fixed with a warning signal connected to the base part by the at least one regulating module, and comprising a safety module that can move relative to the added part. The regulating modules can be designed independently of the movement necessary for the warning signal since they only position the fixed plate.

The at least one stud advantageously has a transversal section which brings about a stop of rotation relative to the direction or projection. It is possible to envisage a stud with a prismatic shape, easy to manufacture, like the impression, for example, by moulding. Such an arrangement is compact and very easy to use for a mounting operator: the prismatic naturally imposes the mounting in the first or the second position.

The at least one regulating module advantageously comprises at least two studs in such a manner as to prevent the rotation between these at least two studs in the at least one impression. It is possible to envision two circular studs spaced from one another with the one forming a stop of the impression in rotation around the other stud.

The regulating means advantageously comprises a visual mark arranged to indicate a direction of regulating the position of the added part and visible for an operator once the regulating module is mounted. It is possible to envision inscribing an arrow which indicates the direction of the offset brought about by the selected position.

In other words, the disclosure relates to an automobile comprising a vehicle steering wheel according to the preceding aspect.

In other words, the disclosure relates to a regulating kit for the regulating means of the vehicle steering wheel according to the previous aspect, comprising a plurality of the at least one stud or of the at least one impression designed to offset the other at least one stud or the other at least one impression relative to the centring part, each one designed to offset by a specific value the other at least one stud or the at least one impression relative to the centring part.

Such a kit can propose a set of components (the stud or the impression, which is movable relative to the steering wheel, for example) with several offset values and several colours to facilitate its usage. It is then possible to easily regulate in a fine and definitive manner the position of the added part.

A last aspect of the disclosure relates to a process for manufacturing a steering wheel according to the first aspect of the disclosure, comprising the steps consisting of manufacturing the base part, measuring an error of geometry between a part of the base part visible by a final user and one of the at least one receiving element or of the at least one regulating element, mounting the other at least one receiving element or the at least one regulating element in the first position or in the second position in such a manner as to at least partially correct the measured geometry error, and mounting the added part on the steering wheel.

In other words, the disclosure relates to a process of manufacturing a steering wheel according to an aspect of the disclosure comprising the steps consisting of manufacturing the base part, measuring an error of geometry between a part of the base part visible by a final user and one of the at least one stud and of the at least one impression, mounting the other one of the at least one stud or of the at least one impression in the first position or in the second position in such a manner as to at least partially correct the measured geometry error, and mounting the added part on the steering wheel.

Such a manufacturing process has the advantage of being able to regulate the position of the added part even before mounting the added part. In fact, if the predefined reference part, for example visible by the user, is formed by a process with large geometric overdiversifications, this is the main cause of geometric errors and these errors can be corrected at the level of the base part with the regulating modules.

This process is particularly advantageous when the at least one impression has a tight adjustment with the at least one stud, and/or when the regulating means comprise support means for the at least one impression on the at least one stud. In fact, the base part with the regulating means can then be transported from one factory to another one in order to finish the assembly.

BRIEF DESCRIPTION OF THE DRAWINGS

Other characteristics and advantages of the present disclosure will appear more clearly from a reading of the following detailed description of an embodiment of the disclosure given by way of non-limiting example and illustrated by the attached drawings in which:

FIG. 5 shows a detail of a variant of the regulating means of FIG. 1.

DETAILED DESCRIPTION

Figure 1:
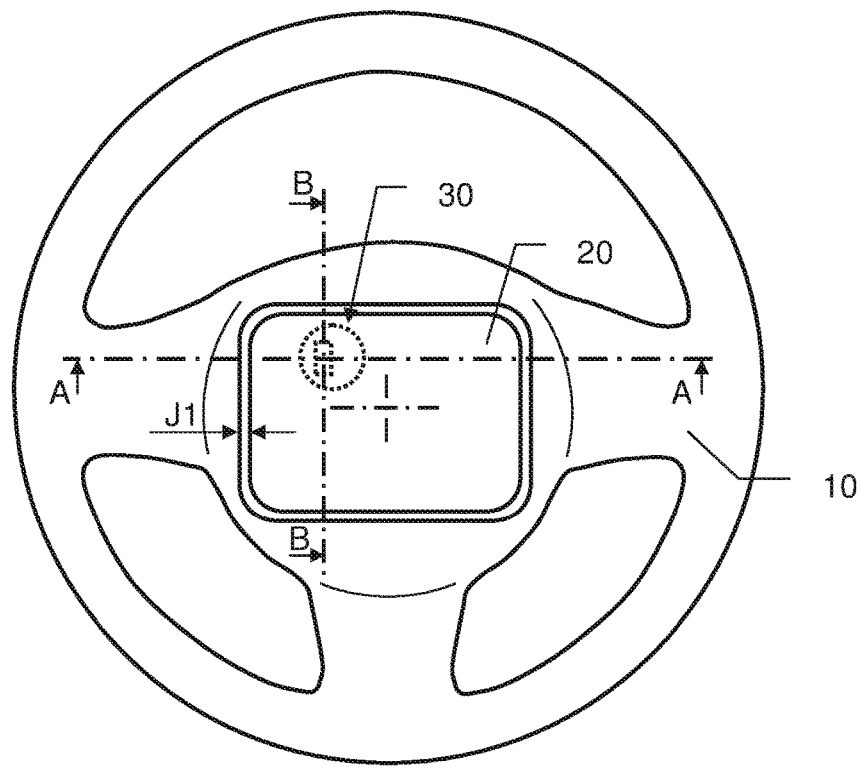
FIG. 1 represents a general view of a vehicle steering wheel according to the disclosure, comprising means for regulating a position of an added part on a base part.

FIG. 1 shows a vehicle steering wheel according to the present disclosure viewed from above. A base part 10 places an added part 20. The added part 20 is typically a safety module, otherwise called an airbag module. The added part 20 is mounted in a housing of the base part 10, and a space between these two parts is visible. In a general manner, it is necessary to provide a good centring or a harmonious adjustment between the added part 20 and the base part 10 in order to obtain a good perceived quality (typically, the spaces between the components must be regular and homogeneous).

As concerns the steering wheel of FIG. 1, there is a need to regulate the play J1 between the added part 20 and the base part 10. In other words, it is necessary to be able to regulate the position of the added part 20 along the horizontal direction of FIG. 1, that is, in the direction of the axis A-A.

To this end the disclosure proposes providing regulating means with the regulating module 30 between the added part 20 and the base part 10. FIG. 1 only shows one regulating module 30 but it is advantageous to provide two identical regulating modules 30, each one mounted between the base part 10 and the added part 20 and both of them are arranged so as to regulate a position of the added part in the horizontal direction in this example.

Figure 2A:
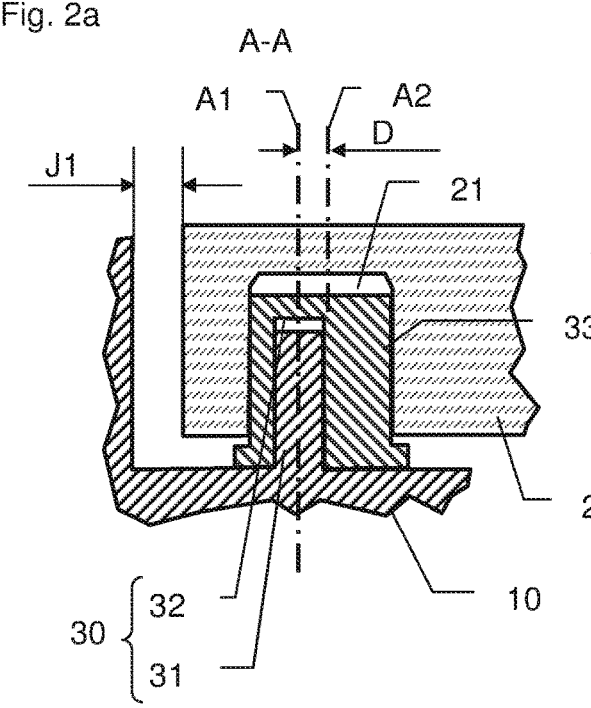
FIG. 2a shows a partial section of the regulating means of FIG. 1 along a first direction A-A.

FIG. 2a shows a section of a regulating module 30 along the axis A-A of FIG. 1. The regulating module 30 comprises a stud 31 forming a receiving element and an impression 32 forming a regulating element and formed in a casing 33. The stud 31 is a protuberance on the base part 10 and the casing 33 is engaged in a bore 21 of the added part 20, forming a centring part. As an alternative, the bore 21 can be a groove in another embodiment.

As FIG. 2a shows, the stud 31 extends along a direction of projection A1. As can be seen in FIG. 2a and especially FIG. 4, the stud 31 has a prismatic shape. As FIGS. 2a, 2b and also FIG. 5 show, the casing 33 carries an impression 32 or 32a which is a counter-form of the form of the stud 31 in such a manner that once mounted as in FIGS. 2a and 2b, no rotation is possible between the stud 31 and the casing 33 without dismounting or definitively damaging the parts, of course. This impression 32 or 32a also prevents any translation of the stud 31 in a plane perpendicular to the direction of projection A1.

The casing 33 is engaged in the bore 21 of the added piece, which has an axis A2. The disclosure proposes shaping the casing 33 with the impression 32 having an axis (coinciding with the direction of projection A1) offset from an axis of symmetry of its outer surface (coinciding with the axis A2) which engages with the bore 21 by an offset value D. As a consequence, as FIG. 2a shows, the stud 31, mounted in this position, brings about an offset of the axis A2 of the bore 21 relative to the direction of projection A1.

Figure 2B:
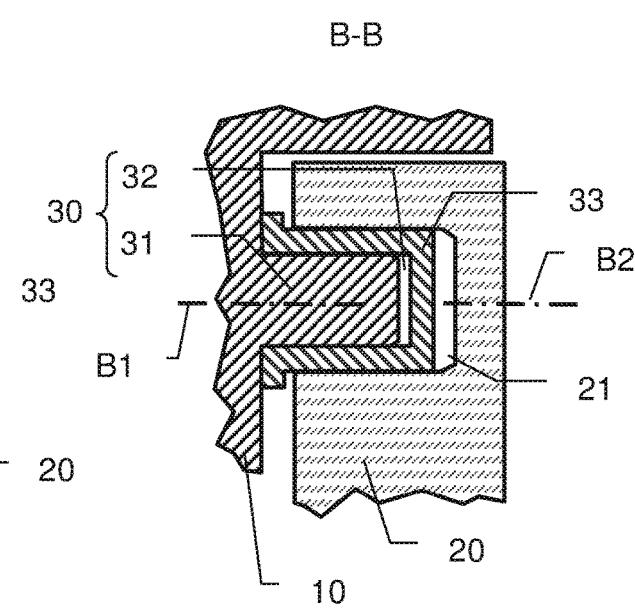
FIG. 2b shows a partial section of the regulating means of FIG. 1 along a second direction B-B.
Figure 2C:
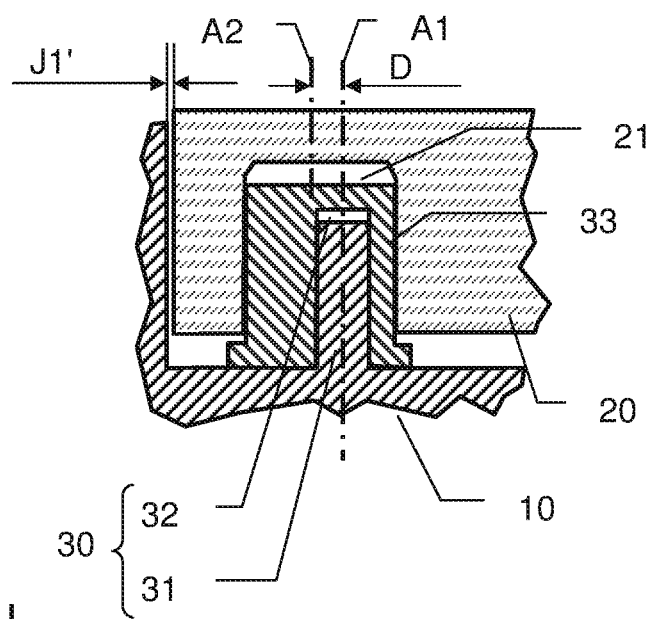
FIG. 2c shows the partial section of FIG. 2a with the regulating means in a second mounting position.

It is understood that if the casing 33 is disengaged from the stud 31 and if it is remounted after a rotation of 180°, the direction of projection or axis A1 of the stud 31 is offset relative to the axis A2 of the bore 21 in the opposite direction, as FIG. 2c shows (the added part was therefore offset to the right).

As a consequence, the impression 32, offset in the casing 33 relative to its outer surface which engages into the bore 21, permits two different positions of the added part 20 to be able to be imposed relative to the base part 10 as a function of the desired regulating. In particular, the added part 20 was offset in only one direction (the horizontal direction A-A of FIG. 1) by more or less the offset value D relative to the base part 10. Only the play or the dimension J1 (or J1', FIG. 2c) is modified when the casing 33 is mounted in the one or the other position. In fact, as FIG. 2b shows, the axis BI of the stud 31 is aligned with the axis B2 of the bore 21 because the impression 32 of the casing 33 is not offset relative to the bore 21 in this direction.

Figure 3:
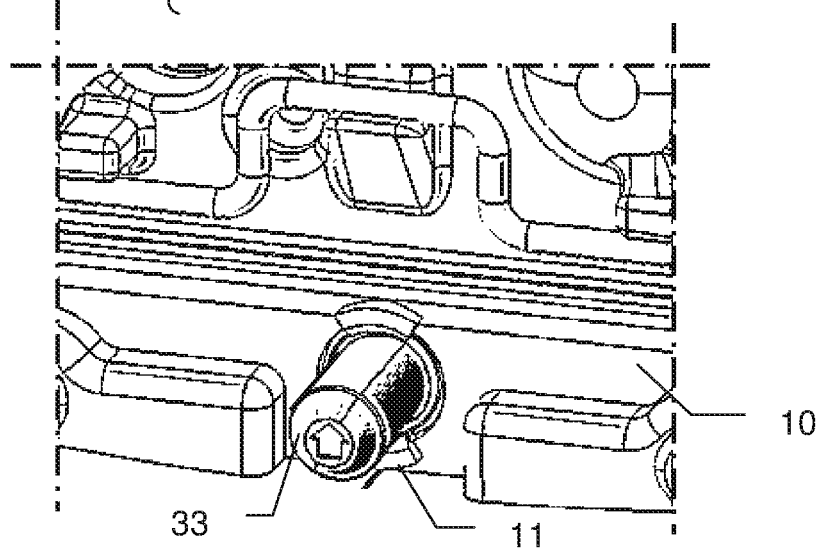
FIG. 3 shows a perspective view of part of the regulating means of FIG. 1.

FIG. 3 shows a perspective view of the casing 33 and in particular an arrow which is formed on its outer surface. This arrow allows the indicating of the direction of the offset D to a mounting operator in order to assist in the mounting of the regulating module 30.

Figure 4:
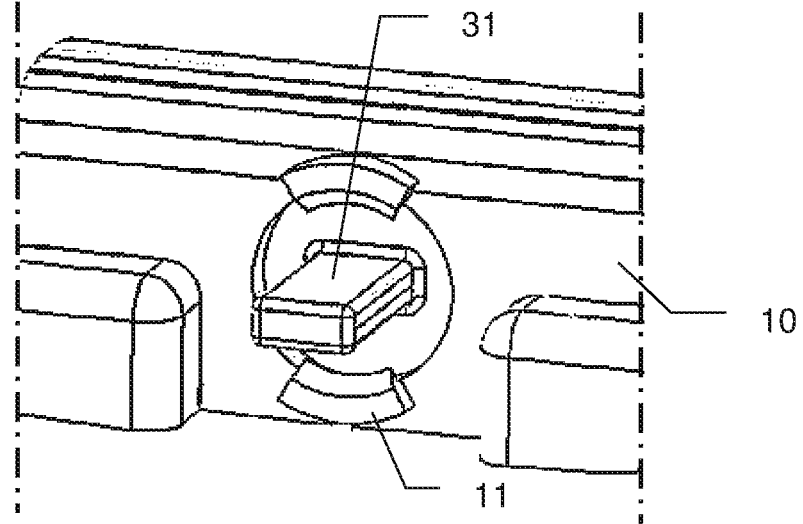
FIG. 4 shows another perspective view of another part of the regulating means of FIG. 1.

It can also be noted in FIG. 3 in FIG. 4 that two lugs 11 are formed on the base part 10 in order to keep the casing 33 in place on the stud 31. The two lugs 11 can be formed by polyurethane moulded on a frame of magnesium, which frame can form the stud or the studs 31. Therefore, a subassembly is formed and can be transported without the risk of losing the casing 33. It is then also possible to envision manufacturing the steering wheel in several stages. In particular, it is possible to manufacture the base part 10 of the steering wheel in one location, measure any geometrical error and mount one or several casings 33 on one or several studs 31 in order to compensate the measurement error, and to then send the subassembly to another factory where the added part 20 will be mounted, which will be correctly positioned due to the regulating means 30 already in place.

This method of manufacture allows the greatest number of errors to be prevented because the base part generally comprises injected polymer parts (a polyurethane foam, for example) which are sources of great geometric variations.

As an alternative to the lugs 11, it is possible to envisage other means for holding the casing 33 in place on the stud 31, and in particular a tight mounting of the elastically deformed feet, a magnet, an elastic interlocking . . . . For the elastic feet, it is possible to envisage two facing one another in order to pinch a part of the at least one stud 31. These feet can preferably be positioned on surfaces of the impression 32 which do not face this reference surface so that the tightness does not deform the reference surface and does not influence the desired regulating.

Moreover, it is possible to provide that the casing 33 is pierced in order to allow access to the top of the stud 31 in order to take a mechanical reference there, for example.

FIG. 5 shows a variant of the casing 33, and in particular of its impression 32a which comprises two counter-forms of the stud 31 oriented at 90° to one another. One of the counter-forms is offset relative to the outer surface of the casing 32. This concerns the vertical counter-form of axis A1 which is offset toward the bottom in the direction of its length relative to the axis A2 (representing the axis of the bore 21 and/or the axis of the outer cylinder of the casing 33). The horizontal counter-form is not offset and its axis B1 coincides with the axis of the outer diameter of the casing 33.

As a consequence, three possible mounting positions are obtained: a first position offset in one direction when the vertical counter-form is mounted in a first position, a second position offset in an opposite direction when the vertical counter-form is mounted in a second position (180° from the first position) and a median or neutral third position when it is the horizontal counter-form which receives the stud 31.

Of course, if the horizontal counter-form was also offset relative to the outer surface of the casing 33, four regulating positions could be obtained with only two counter-forms but no neutral regulating would be possible in this case.

Once the regulating modules are mounted, any regulating is impossible without deteriorating or dismounting the parts again. Each casing has a limited and finite number of regulating possibilities, which simplifies the complete system. It is possible to provide a regulating kit with several casings having different offset values in order to fine-tune the possibilities of regulation. It is possible to provide differentiating the casings among themselves by specific colours, for example.

It is understood that various modifications and/or improvements evident to a person skilled in the art can be added to the various embodiment of the disclosure described in the present description without departing from the scope of the disclosure defined by the attached claims. In particular, reference is made to a casing carrying the impression and which is movable relative to the steering wheel. However, it is possible to provide making the stud movable. Furthermore, the casing is engaged with the added part and the stud to the base part, but the opposite can be provided.

What is claimed is:

1. A steering wheel for a vehicle, the steering wheel comprising:
    a base part;
    an added part to be attached to the base part;
    a male element extending from one of the base part and the added part along a direction of projection;
    a cylindrical bore in the other of the base part and the added part; and
    a regulating element proving an interface between the male element and the cylindrical bore, the regulating element including an opening receiving the male element so as to prevent relative rotation and prevent relative translation between the male element and the regulating element in a plane perpendicular to the direction of projection, the regulating element including a cylindrical outer diameter received within the cylindrical bore,
    wherein the male element has a non-circular cross-sectional shape in a plane perpendicular to the direction of projection and the male element has a first axis of symmetry parallel to the direction of projection, and the regulating element has an eccentrically located opening and the opening has a second axis of symmetry parallel to the direction of projection, the first axis of symmetry spaced from the second axis of symmetry, wherein the eccentrically located opening of the regulating element has a cross-sectional shape corresponding with the male element such that the regulating element and the male element cooperate to provide first and second alternative mounting positions of the added part relative to the base part, and the non-circular cross-sectional shape of the male element cooperates with the eccentrically located opening of the regulating element to prevent relative rotation between the male element and the regulating element in the plane perpendicular to the direction of projection, and wherein the second alternative mounting position is angularly offset from the first alternative mounting position relative to the direction of projection.

2. The steering wheel according to claim 1, wherein the male element and the regulating element cooperate to define a regulating device for regulating a position of the added part in a base plane, the direction of projection being perpendicular to the base plane.

3. The steering wheel according to claim 2, wherein the regulating device regulates the position of the added part in only one direction.

4. The steering wheel according to claim 2, wherein the regulating device includes elastic support means on the male element at least in the direction of projection.

5. The steering wheel according to claim 2, wherein the regulating device comprises two regulating modules.

6. The steering wheel according to claim 2, wherein the added part is a plate fixed to a warning signal, mounted in a fixed manner relative to the base part by the regulating module, and comprising a safety module movable relative to the added part.

7. The steering wheel according to claim 1, wherein the second alternative mounting position is oriented 180° from the first alternative mounting position relative to the direction of projection.

8. The steering wheel according to claim 1, wherein the regulating element is assembled with the male element according to at least one third mounting position, and in which the male element or the regulating element positions the other of the male element or the regulating element in such a manner as to impose a third position of the added part relative to the base part in the third mounting position.

9. The steering wheel according to claim 1, wherein the regulating element has a tight adjustment with the male element.

10. The steering wheel according to claim 1, wherein the male element has a transversal section which brings about a stop of a rotation relative to the direction of projection.

11. The steering wheel according to claim 1, wherein the male element is integral with the base part and the regulating element is arranged on a movable casing arrangement and engages with the added part.

12. The vehicle steering wheel according to claim 1, in combination with a vehicle.

13. The steering wheel according to claim 1, wherein the male element has a prismatic shape.

14. The steering wheel according to claim 1, wherein the added part is an airbag module and the added part defines the cylindrical bore.

15. The steering wheel according to claim 1, wherein the male element has a rectangular cross section in the plane perpendicular to the direction of projection.

16. The steering wheel according to claim 1, wherein the male element has a cruciformed shaped cross section in the plane perpendicular to the direction of projection.

* * * * *